(12) United States Patent
Narver et al.

(10) Patent No.: US 8,387,127 B1
(45) Date of Patent: Feb. 26, 2013

(54) STORAGE SECURITY APPLIANCE WITH OUT-OF-BAND MANAGEMENT CAPABILITIES

(75) Inventors: Andrew Narver, Menlo Park, CA (US); Yuval Frandzel, Foster City, CA (US); Anant Chaudhary, Foster City, CA (US); Zi-Bin Yang, San Francisco, CA (US); Vaibhave Agarwal, Mountain View, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 1123 days.

(21) Appl. No.: 11/998,217

(22) Filed: Nov. 28, 2007

(51) Int. Cl.
*G06F 21/00* (2006.01)

(52) U.S. Cl. ............................. 726/11; 726/22; 713/100

(58) Field of Classification Search .................. 726/1
See application file for complete search history.

(56) References Cited

U.S. PATENT DOCUMENTS 6,295,272 B1 * 9/2001 Feldman et al. ............. 370/210
2003/0093501 A1 * 5/2003 Carlson et al. .............. 709/220

OTHER PUBLICATIONS

Decru® White Paper: "Enterprise-Wide Storage Security with Decru Data-fort Appliances", 9 pages. Copyright 2005 Decru, A NetApp Company, 275 Shoreline Drive, Fourth Floor, Redwood City, CA 94065 1 877 22DECRU info@decru.com.*
Decru® White Paper: "Enterprise-Wide Storage Security with Decru DataFort™ Appliances", 9 pages. Copyright 2005 Decru, A NetApp Company, 275 Shoreline Drive, Fourth Floor, Redwood City, CA 94065 1 877 22DECRU info@decru.com.

* cited by examiner

*Primary Examiner* — Gilberto Barron, Jr.
*Assistant Examiner* — Devin Almeida
(74) *Attorney, Agent, or Firm* — Blakely, Sokoloff, Taylor & Zafman LLP

(57) ABSTRACT

A data security appliance intercepts out-of-band control traffic directed to a data storage device, wherein the out-of-band control traffic includes a command to change a configuration of the data storage device. The data security appliance is reconfigured in accordance with the command in order to conform with a new configuration of the data storage device.

21 Claims, 7 Drawing Sheets

STORAGE SECURITY APPLIANCE WITH OUT-OF-BAND MANAGEMENT CAPABILITIES

TECHNICAL FIELD

Embodiments of the present invention relate to securing data, and more specifically to a security appliance that transparently intercepts and acts on control traffic and data traffic transmitted between a host and a storage device.

BACKGROUND

Conventional storage security appliances are used to protect data in direct attached storage (DAS), network attached storage (NAS), storage area network (SAN), tape, and other storage environments. Conventional storage security appliances protect data by encrypting the data before it is stored or as it is stored. An example of such a conventional storage security appliance is DataFort® by Decru® of Redwood City, Calif. Such conventional storage security appliances may be added to a storage environment that uses in-band signaling (wherein metadata and control information are sent between a host and a storage device using the same protocol as data), or a storage environment that uses out-of-band signaling (wherein metadata and control information are sent using a different protocol from that used to send data).

FIG. 1 illustrates a conventional network architecture 100 in which out-of-band signaling is used to manage a storage device. The conventional architecture 100 includes a host or client 105, a storage device 110, and a conventional security appliance 125. The storage device 110 includes a control module 115 for managing the storage device 110, and a storage module 120 for storing data on, deleting data on, and/or retrieving data from the storage device 110.

The conventional security appliance 125 is disposed in a data path between the host or client 105 and the storage device 110. The conventional security appliance 125 intercepts, encrypts, and decrypts data transmitted between the host/client 105 and the storage device 110, thus securing data stored on storage device 110. Therefore, all data traffic (e.g., unencrypted data traffic 130 and encrypted data traffic 135) flows through the conventional security appliance 125.

In the conventional network architecture 100, no control traffic 140 flows through the conventional security appliance 125. Therefore, when control traffic 140 includes commands that cause the control module 115 to modify the storage device 110 (e.g., to add a new drive, modify an existing drive, change permissions to a drive, etc.), the conventional security appliance 125 is uninformed of such modifications. To enable the conventional security appliance 125 to take advantage of modifications to the storage device 110, additional commands must be sent to the conventional security appliance 125 to alert it to the changes made on the storage device 110. For example, if a new drive is provisioned on the storage device 110, the conventional security appliance 125 cannot write to the new drive until an administrator reconfigures the conventional security appliance 125 to add information concerning the new drive. Moreover, for new drives created without the knowledge of the conventional security appliance 125, the conventional security appliance 125 may not know how to encrypt data stored on the drive (e.g., what encryption key to use). This may add an additional burden to an administrator of the storage device 110.

SUMMARY

A data security appliance intercepts out-of-band control traffic directed to a data storage device, wherein the out-of-band control traffic includes a command to change a configuration of the data storage device. The data security appliance is reconfigured in accordance with the command in order to conform with a new configuration of the data storage device.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Figure 1:
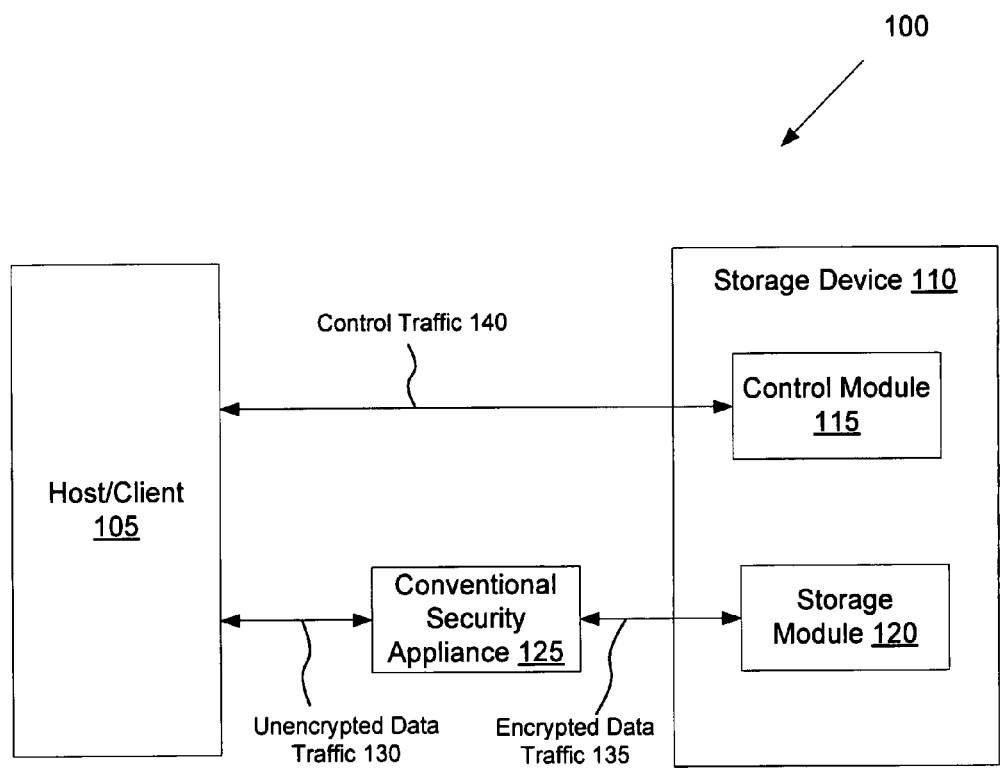
FIG. 1 illustrates a conventional network architecture in which out-of-band signaling is used to manage a storage device.

Described herein is a method and system for encrypting networked storage. In one embodiment, a security appliance intercepts out-of-band control traffic directed to a storage device. The out-of-band control traffic may include a command to change a configuration of the storage device. The security appliance may also intercept data traffic and/or in-band control traffic directed to the storage device. Intercepted traffic may be analyzed and/or forwarded to the storage device. The security appliance may be reconfigured in accordance with the command in order to conform with a new configuration of the storage device. The reconfiguration may be performed upon intercepting a response from the storage device at the security appliance.

In the following description, numerous specific details are set forth such as examples of specific systems, languages, components, etc. in order to provide a thorough understanding of the present invention.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.), etc.

Unless specifically stated otherwise as apparent from the following discussion, it is appreciated that throughout the description, discussions utilizing terms such as "processing" or "generating" or "calculating" or "determining" or "transmitting" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Figure 2A:
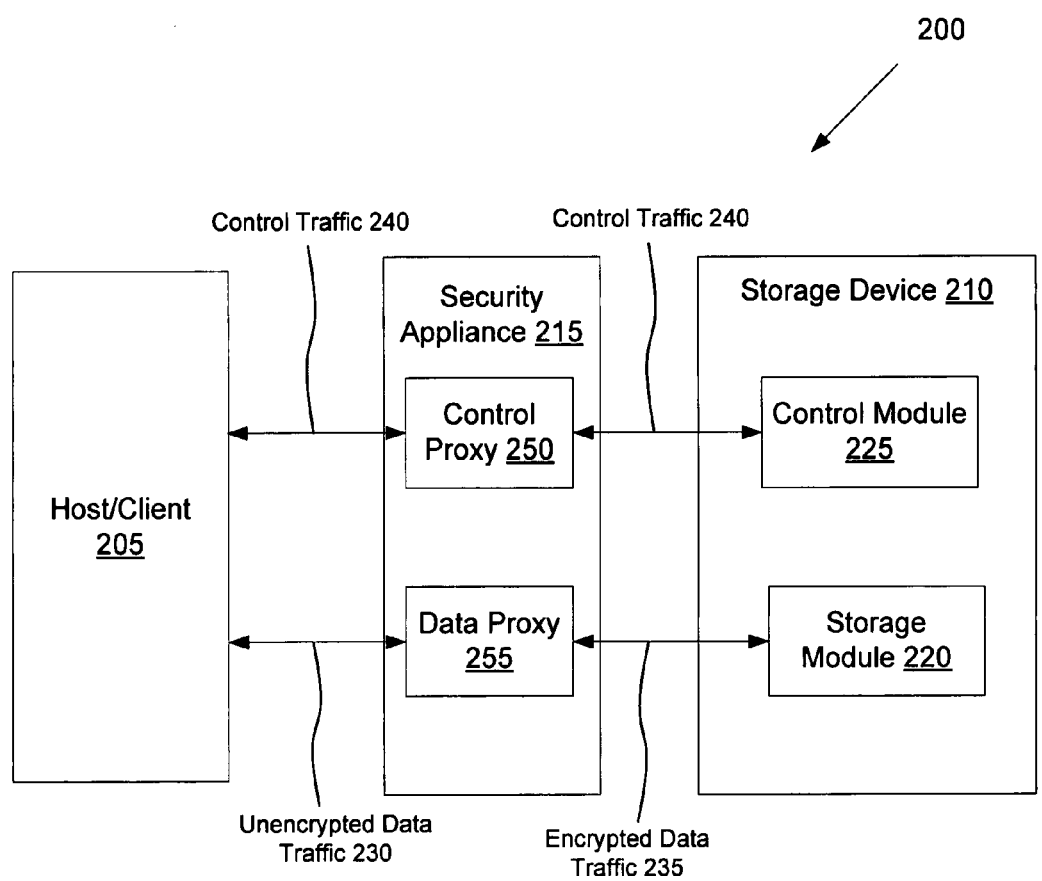
FIG. 2A illustrates an exemplary network architecture in which embodiments of the present invention may operate.

FIG. 2A illustrates an exemplary network architecture 200 in which embodiments of the present invention may operate. The network architecture 200 includes a host, console, or client (hereinafter "host") 205 connected with a storage device 210 via a high-speed network (e.g., a local area network (LAN), a wide area network (WAN), etc.). Host 205 is a computing device such as a desktop computer, laptop computer, server, etc., that stores data to and/or reads data from storage device 210.

Storage device 210 may be a single data storage device or an array of data storage devices such as disk drives, tape drives (or other magnetic media drives), optical drives, or a combination thereof, and an interface for accessing the array of drives (e.g., a file server (filer), disk array controller, SAN server, etc.). Storage device 210 may be configured to operate in any one or more of a variety of configurations, such as network attached storage (NAS), a storage area network (SAN), a direct attached storage (DAS), or according to another appropriate storage configuration. Storage device 210 provides storage to host 205, and may further provide storage to additional hosts and/or clients (not shown).

In one embodiment, storage device 210 includes a control module 225 and a storage module 220. Storage module 220 manages the actual storage and retrieval of data from the data storage devices that are included in the storage device 210. Storage module 220 may receive commands via data traffic 230, 235, for example, to read data, write data, modify data, and/or delete data. Storage module 220 may execute such commands provided that host 205 has privileges to issue the commands. Storage module 220 may then send response data traffic back to host 205.

Control module 225 manages the configuration of storage device 210. Common management functions include allocating space, creating new logical drives, granting access to or removing access from existing drives, post to host, sharing space, etc. Control module 225 may change a configuration of the storage device 210 in accordance with received control traffic 240. Such a reconfiguration may include adding a new physical drive, adding a new logical drive, changing the address or name of a drive, changing host privileges for a drive, removing or modifying a physical or logical drive, etc. Control module 225 may further send response control traffic 240 back to the host 205 to indicate that a change in configuration has or has not been successfully completed.

Host 205 and storage device 220 may exchange control traffic 240 and data traffic 230, 235 using one or more network and/or storage protocols, examples of which include nonproprietary protocols such as small computer system interface over internet protocol (iSCSI), Fiber Channel Protocol (FCP), transmission control protocol/internet protocol (TCP/IP), file transfer protocol (FTP), and network file system (NFS), and proprietary protocols such as the common internet file system (CIFS), Internetwork Packet Exchange/Sequenced Packet Exchange (IPX/SPX), and systems network architecture (SNA). Other network and/or storage protocols may also be used.

In one embodiment, the control traffic 240 and the data traffic 230, 235 use the same transmission protocol. Such a configuration is referred to as in-band signaling, and enables in-band management of storage device 210. In another embodiment, a different transmission protocol is used for the data traffic 230, 235 and the control traffic 240. Such a configuration is referred to as out-of-band signaling, and enables out-of-band management of storage device 210. For example, the HTTP protocol may be used for control traffic 240, and the FCP or iSCSI protocols may be used for data traffic. Metadata (e.g., data regarding the size of a disk, permissions, or other meta information) may be included in one or both of the control traffic and the data traffic, whether in-band signaling or out-of-band signaling is used. Whether metadata is included in the data traffic 230, 235 or control traffic 240 may be dependant upon the storage protocols and/or network protocols used.

A security appliance 225 is disposed between the host 205 and the storage device 220 on the high speed network such that the security appliance 225 intercepts all control traffic 240 and all data traffic 230, 235 transmitted between the host 205 and the storage device 220. In one embodiment, the security appliance 225 transparently intercepts and forwards control traffic 240 and data traffic 230, 235 such that there is little or no indication to either the host 205 or the storage device 220 that the security appliance 225 is present. Therefore, the security appliance 215 may be added to an existing network architecture (e.g., network architecture 200) without a need to modify either the host 205 or the storage device 210. In one embodiment, host 205 is configured to send data traffic and control traffic to security appliance. For example, host 205 may be configured to use security appliance 215 has a proxy server. In another embodiment, security appliance intercepts messages from the host 205 addressed to the storage device 210 and/or messages from the storage device 210 addressed to the host 205.

In one embodiment, security appliance 225 includes a control proxy 250 and a data proxy 255. Control proxy 250 intercepts and forwards control traffic 240 transmitted between host 205 and storage device 210. Security appliance parses the control traffic 240, and stores any commands included therein. When security appliance 215 receives confirmation that commands to change a configuration of storage device 210 were successfully executed (e.g., via response control traffic), security appliance 215 can reconfigure itself (e.g., if a reconfiguration is necessary) to conform to the changed configuration of storage device 210. This permits security appliance 215 to automatically adjust its parameters as necessary to communicate with storage device 210.

Data proxy 255 intercepts and forwards data traffic 230, 235 transmitted between host 205 and storage device 210. Data traffic exchanged between the data proxy 255 and the host 205 is unencrypted data traffic 230 (e.g., transmitted in clear text). Security appliance 215 encrypts such unencrypted data traffic 230 before forwarding it to storage device 210. Data traffic exchanged between security appliance 215 and storage device 220 is encrypted data traffic 235 (e.g., using data encryption standard (DES), advanced encryption standard (AES), etc.). Security appliance 215 decrypts such encrypted data traffic 235 before forwarding it to host 205. Therefore, data can be securely stored on storage device 210 in an encrypted state, and can automatically be decrypted as necessary to be read by host 205.

Figure 2B:
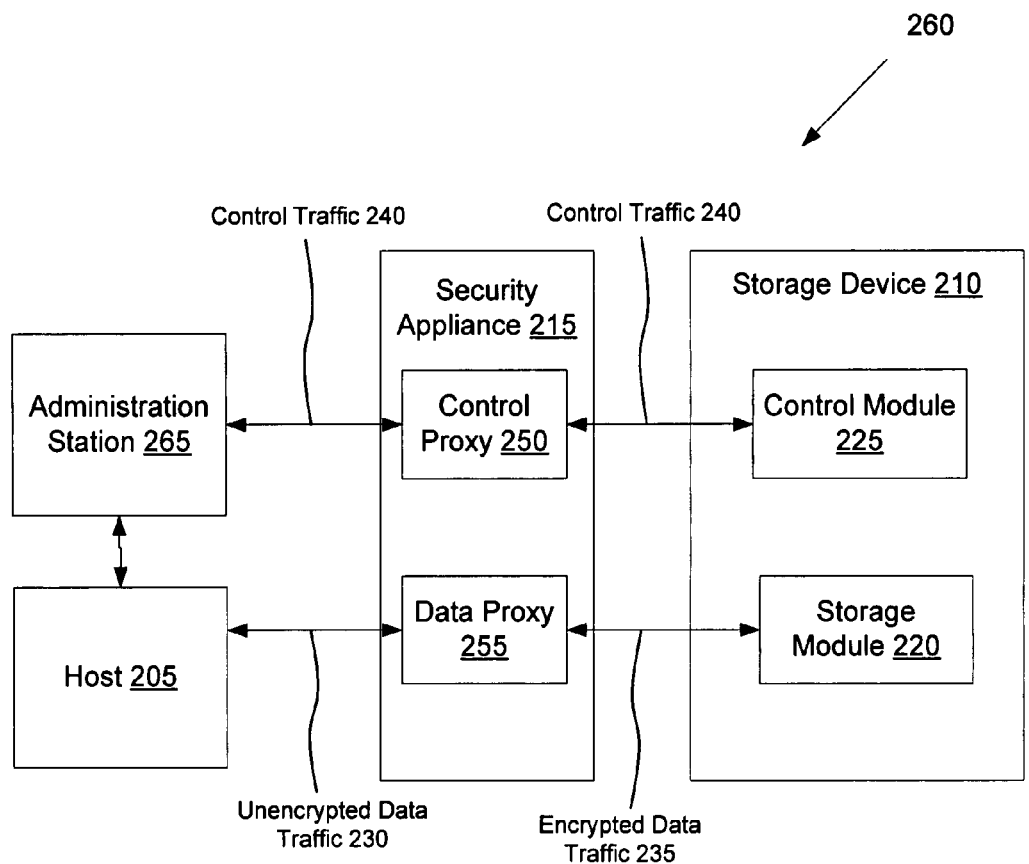
FIG. 2B illustrates another exemplary network architecture, in which further embodiments of the present invention may operate.

FIG. 2B illustrates another exemplary network architecture 260, in which further embodiments of the present invention may operate. The network architecture 260 includes a host 205, administration station 265, and storage device 210 connected via a high speed network. The network architecture 260 further includes a security appliance 215 disposed on the network between the storage device 210 and the administration station 265, and between the storage device 210 and the host 205. Security appliance intercepts control traffic 240 transmitted between administration station 265 and storage device 210, and data traffic 230, 235 transmitted between host 205 and storage device 210.

Administration station 265 is a computing device (e.g., a server, desktop computer, laptop computer, etc.) that is configured to perform administrative functions, such as managing the configuration of storage device 210. By restricting administrative functions to administrative station 265, security of the network architecture 260 and of storage device 210 may be improved.

In one embodiment, no control traffic is exchanged between host 205 and storage device 210 (or between host 205 and security appliance 215). Instead, all control traffic is transmitted between administration station 265 and storage device 210. If host 205 needs an administrative task to be performed (e.g., to add a new drive to storage device, to rename an existing drive, etc.), it may send a request to the administration station 265 to perform the administrative task. The administration station 265 can then communicate with the control module 225 (through control proxy 250) to perform the administrative task (e.g., by sending an appropriate command in control traffic 240). Thereby, administrative and user roles may be separated to improve security.

Figure 3:
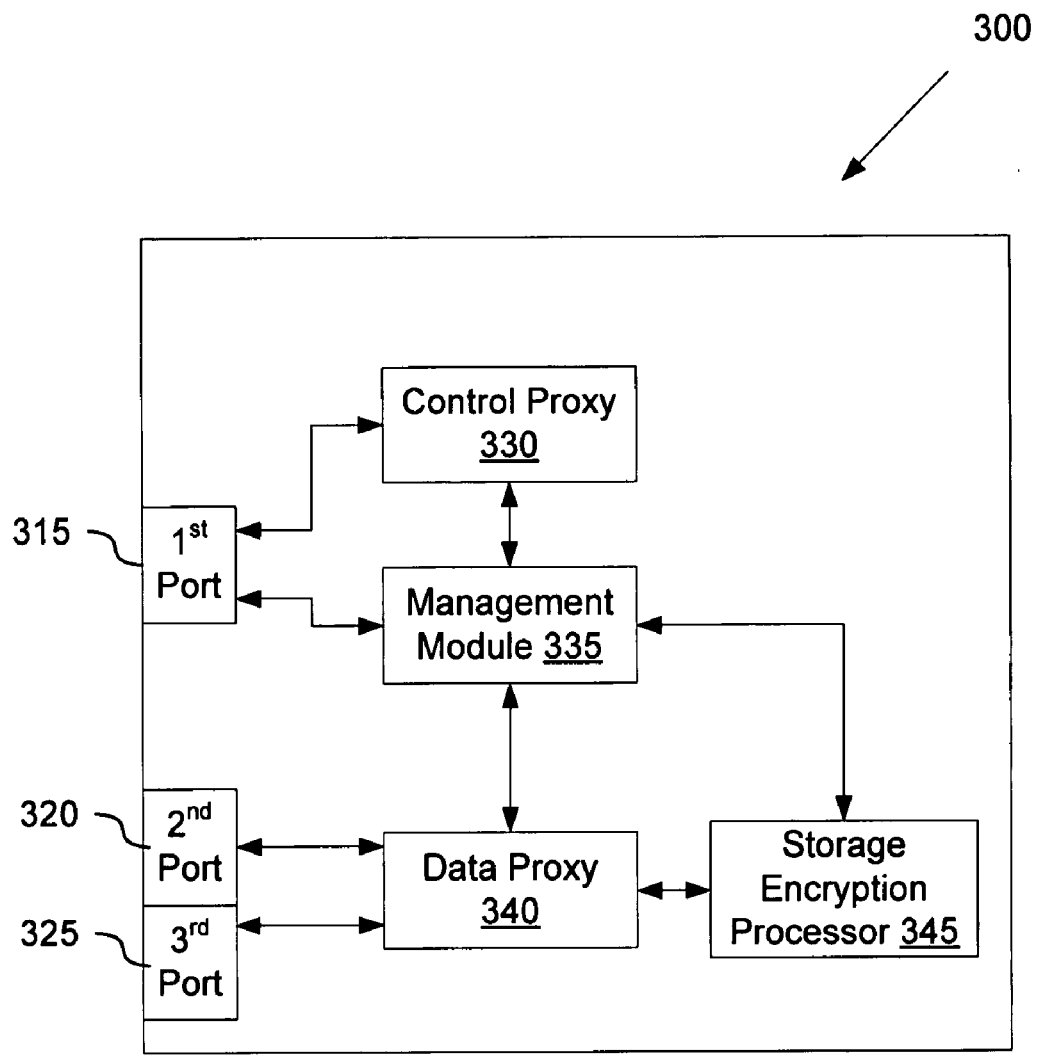
FIG. 3 illustrates a security appliance in accordance with one embodiment of the present invention.

FIG. 3 illustrates a security appliance 300 in accordance with one embodiment of the present invention. In one embodiment, security appliance 300 corresponds to security appliance 215 of FIGS. 2A and 2B. Alternatively, security appliance 300 may differ from the security appliance 215 of FIGS. 2A and 2B. Security appliance 300 may be disposed between a host (or administration station) and a storage device in a network or a non-network environment. For example, security appliance 300 may be disposed in a network between a host and a storage device (as shown in the network configuration of FIG. 2A), or between an administration station and a storage device (as shown in the network configuration of FIG. 2B). Security appliance 300 may also be attached to a switch such that in some instances data traffic and/or control traffic are sent through the security appliance 300, and in other instances data traffic and/or control traffic are sent directly to an intended storage device. Alternatively, security appliance 215 may be incorporated into a storage device.

Referring to FIG. 3, in one embodiment, security appliance 300 includes a first port 315, second port 320, third port 325, control proxy 330, management module 335, data proxy 340 and storage encryption processor 345. In alternative embodiments additional components are added, and/or components are removed. For example, data proxy 340 and control proxy 330 may be combined to form a single proxy, and/or one or more of the first port 315, second port 320 and third port 325 may be combined. In one embodiment, in which in-band signaling is used, the functionality of the first port 315 is included in the second port 320 and/or third port 325, and the functionality of the control proxy 330 is included in the data proxy 340.

Second port 320 and third port 325 are ports configured to send and receive data traffic. Second port 320 is connected with one or more hosts directly or via a network. Third port 325 is connected with one or more storage devices directly or via a network, which may be the same network or a different network than the network to which the second port 320 is connected. In one embodiment, second port 320 and third port 325 are fiber optic ports. Alternatively second port 320 and/or third port 325 may be Ethernet ports, parallel ports, or other ports capable of exchanging data traffic. Data traffic transmitted and received via second port 320 and third port 325 can be sent using iSCSI, FCP, or other storage protocols.

Data proxy 340 is a computing module that is configured to act on data traffic. Such actions may include sending data traffic, receiving data traffic, interpreting data traffic, and so on. In one embodiment, data proxy 340 is connected with second port 320, third port 325, management module 335 and storage encryption processor 345.

In one embodiment, unencrypted data traffic is exchanged between data proxy 340 and a host via second port 320, and encrypted data traffic is exchanged between data proxy 340 and a storage device via third port 325. When data traffic is received from a host (e.g., via second port 320), data proxy 340 can determine whether the data traffic includes a read command, write command, delete command, or other appropriate data related command (e.g., by parsing the data traffic). Data proxy 340 can then determine an appropriate action based on the command or commands included in the data traffic.

In a first example, if a read request is received at the data proxy 340 (e.g., via the second port 320), it forwards the read request to a storage device (e.g., via the third port 325). Encrypted data is then received from the storage device (e.g., via the third port 325). Data proxy 340 can send the encrypted data to the storage encryption processor 345 to have the data decrypted. Once the data has been decrypted, data proxy 340 sends the unencrypted data to the host that requested it (e.g., via the second port 320).

In a second example, if a write request is received (e.g., via the second port 320), data proxy 340 sends the data included in the write request to the storage encryption processor 345. Storage encryption processor 345 encrypts the data. Data proxy 340 then sends the encrypted data along with the write request to a storage device (e.g., via the third port 325) to be stored.

In one embodiment, data proxy 340 includes a storage access allowance list. If a host requests access to a drive or logical unit number (lun) (e.g., to read to or write from the lun), data proxy 340 checks an identification of the host against the storage access allowance list. If the host has access to the lun or drive, the request is processed (e.g., forwarded to an appropriate storage device). Otherwise, the request may not be processed.

Storage encryption processor 345 is a computing module that encrypts and decrypts data that is to be stored on or read from a storage device. Each lun or drive on a storage device may be associated with a unique encryption key that is maintained by the storage encryption processor 345, and which the storage encryption processor 345 uses to encrypt and decrypt data on that lun or drive. When read requests or write requests are received by data proxy 340, data proxy 340 forwards data associated with those requests to storage encryption processor 345 for encryption or decryption. Storage encryption processor 345 may decrypt or encrypt the data using an appropriate unique encryption key, and return encrypted or decrypted data back to the data proxy 340.

First port 315 is a port configured to send and receive control traffic. First port 315 may be connected with a host, storage device and/or administration station via a network to exchange control traffic. In one embodiment, first port 315 is an Ethernet port. Alternatively, first port 315 may be a usb port, firewire port, fiber optic port, or other port capable of exchanging control traffic. First port 315 may send and receive control traffic that is configured using TCP/IP, hypertext transfer protocol (HTTP), common internet file system (CIFS), or other network protocols.

Control proxy 330 is a computing module configured to act on control traffic. Such actions may include sending, receiving, interpreting, storing, modifying, or performing other actions on control traffic. In one embodiment, control proxy 330 is connected with first port 325 and management module 335.

In one embodiment, control proxy 330 parses received control traffic to determine any commands included therein. Examples of such commands include commands to create a new lun, to mount an old lun, to rename a drive, etc. Control proxy 330 includes logic that performs actions based on received commands. Such logic may be implemented as dispatch routines, command tables, etc. Control proxy 330 may include a separate dispatch routine or entry in a command table for each known command. In one embodiment, control proxy has separate logic for each communication protocol that it understands. For example, control proxy 330 may include a first logic for interpreting CIFS commands, a second logic for understanding SnapManager® commands, a third logic for understanding iSCSI commands, and so on. Alternatively, control proxy 330 may include a single logic for understanding commands from multiple protocols. Control proxy 330 can apply an appropriate logic to take actions, the actions depending on the commands that have been determined.

In one embodiment, control proxy 330 modifies some or all commands included in control traffic. Commands can be modified, for example, to replace host identifying information (e.g., IP address, fiber channel world wide name (WWN), etc.) to reflect identifying information of the security appliance 300. This enables any command traffic sent by a storage device in response to control traffic that originated from a host to be directed to the security appliance 300.

In one embodiment, control proxy 330 stores commands included in control traffic that is received from a host or administration station. The commands can be stored in a volatile storage (e.g., random access memory (RAM), synchronous dynamic random access memory (SDRAM), etc.) or a nonvolatile storage (e.g., a hard disk drive, non-volatile random access memory (NVRAM), electrically erasable programmable read only memory (EEPROM), Flash, etc.). Control proxy 330 can then forward the control traffic to a storage device (e.g., via first port 315).

Control proxy 330 may receive control traffic from a storage device (e.g., via first port 315) that indicates whether a command from a host or administration station was successfully performed. Control traffic received from a storage device may indicate, for example, whether a new disk was created, a disk was partitioned, a lun was renamed, etc. Such control traffic may also include additional information relating to the executed command such as, for example, identifying information of a new disk or lun, access privileges, storage capacity, etc. If the control was successfully performed, control proxy 330 can notify management module 335 of a change in configuration to the storage device (e.g., of a new disk, a new partition, new permissions to access a disk, etc.). Control proxy 330 can further notify management module 335 of additional information regarding the executed command if such information is available.

In one embodiment, control proxy 330 includes a control allowance list. The control allowance list can identify commands that are allowed or denied to distinct hosts and/or administration stations. Hosts and/or administration stations from which control traffic is received can be compared to the control allowance list to determine whether requested commands are permitted to that host or administration station. If such commands are allowed, the control traffic is forwarded to the storage device. Otherwise, the control traffic is not forwarded. Use of a control allowance list adds an additional layer of security.

Management module 335 is a computing module that that manages the components of security appliance 300. For example, management module 335 may direct the actions of the control proxy 330, data proxy 340 and storage encryption processor 345. In one embodiment, management module 335 manages a configuration of the security appliance 300, which may include managing configurations of control proxy 330, data proxy 340 and/or storage encryption processor 345.

In one embodiment, management module 335 includes logic that performs actions based on received commands. Such logic may be implemented as dispatch routines, command tables, etc. Management module 335 may include a separate dispatch routine, entry in a command table, etc. for each known command. An exemplary command table is shown below.

TABLE 1

Command Table

| Command | Action |
|---|---|
| Create | Add entries to configuration table and/or permissions table |
| Rename | Modify entries in configuration table and/or permissions table |
| Delete | Remove entries from configuration table and/or permissions table |

Table 1 shows an exemplary command table for performing actions based on received commands. Each entry in the table includes a specific command, and an action or list of actions to perform when the command is received. In performing an action, additional processes, methods and/or actions on which the action depends may be executed. The exemplary command table includes entries for create, rename and delete commands. If a create command is received, management module 335 initiates a procedure that cause entries to be added to a configuration table and/or a permissions table. Likewise, a rename command causes the management module 335 to initiate a procedure that causes existing entries to be modified, and a delete command causes the management module 335 to initiate a procedure that causes existing entries to be removed.

Management module 335 may direct data proxy 340 and/or control proxy 330 to notify a host or administration station of a new configuration of a storage device (e.g., of a new lun) when management module 335 receives a report from control proxy 330 that a configuration of the storage device has changed. This may be achieved via data traffic and/or control traffic. In one embodiment, when management module 335 receives a report that a configuration of a storage device has changed, management module 335 updates data proxy 340 to enable it to utilize any modifications of the storage device. In one embodiment, updating the data proxy 340 includes directing the data proxy 340 to query the storage device to determine information about the changed configuration (e.g., about a new drive). The data proxy 340 can complete this query, for example, by performing a device discovery (e.g., issuing a report lun request) or making other inquiries and/or issuing additional commands to the storage device. What queries/commands are available to the data proxy 340 can be dependent on protocols used for data traffic and/or operating systems or file systems of the storage device. For example, if a SCSI protocol is used, data proxy 340 may send test unit ready, report LUNs, inquiry, and mode sense commands.

Once the data proxy 340 receives information on an updated configuration of a storage device, it can reconfigure itself to enable access to new and/or modified luns, drives, etc. Such reconfiguration may include, for example, adding and/or modifying entries to one or more data structures (e.g., a table or tables) that identify access parameters for specific luns, drives, storage devices, and so on. Data proxy 340 may further report this information to the management module 335. If the new configuration includes a new lun, the management module 335 may direct the storage encryption processor 345 to generate and assign a new key to the new lun. All data stored on the lun can subsequently encrypted using the unique key.

TABLE 1

Configuration Table

| Record ID | Storage Device WWN | LUN Number | Key ID |
|---|---|---|---|
| 1 | 00:50:77 | 1 | 12 |
| 2 | 00:50:77 | 3 | 2 |
| 3 | 00:51:44 | 4 | 80 |

Table 1 shows an exemplary configuration table having three entries, in accordance with one embodiment of the present invention. The configuration table is used by the security appliance 300 to transmit data to storage devices. Each entry in the exemplary configuration table includes a record ID, a WWN of a storage device, a lun number, and a key ID. The record ID is an arbitrary value assigned to an entry to easily track the entry. In certain embodiments, the record ID is omitted. The storage device WWN is a fiber channel address of a storage device. The lun number is a logical unit number that identifies a logical unit within a storage device. As shown, record 1 and record 2 share a storage device WWN, and therefore each represent different luns on a single storage device. Record 3 represents a lun on a different storage device. Each entry includes a key ID. The key ID represents an encryption key that is used to encrypt and decrypt data stored on a lun. If a lun is not encrypted, then the key ID entry may be omitted. In a further embodiment, the configuration table may also include a human understandable name column. The human understandable name represents a label assigned to a specific lun by a user or administrator.

TABLE 2

Permissions Table

| Drive ID | Host WWN | Permission Level |
|---|---|---|
| 1 | 00:42:11 | Full |
| 2 | 00:42:11 | Read Only |
| 3 | 00:42:11 | Read/Write |

Table 2 shows an exemplary permissions table that represents permissions granted to a host to access storage devices. Each entry in the permissions table includes a drive ID, a host WWN, and a permission level. The drive ID identifies an entry in the configuration table. In the illustrated example, the drive ID corresponds to the record IDs in the configuration table. Alternatively, the drive ID may include a combination of a storage device WWN and a lun number. The Host WWN identifies a particular host for which permissions are being set. The permission level represents a degree of access that the host has to the specified drive. The host at 00:42:11 is shown to have full access to drive 1, read only access to drive 2, and read/write access to drive 3.

Reconfiguring the security appliance 300 may include adding one or more entries to the configuration table and the permissions table, or modifying existing entries in one or both tables. For example, if a new lun was added to the storage device having the WWN 00:51:44, a new entry for the lun would be added to the configuration table. If the lun is to be encrypted then a new encryption key would be generated, a key ID would be assigned to the encryption key, and the key ID would be added to the new entry. One or more entries would also be added to the permissions table. For example, a new entry could be added to the permissions table for each host that will use the new lun.

In one embodiment, each of the management module 335, control proxy 330, data proxy 340 and storage encryption processor 345 includes logic executed by a microcontroller, field programmable gate array (FPGA), application specific integrated circuit (ASIC), or other dedicated processing unit. In another embodiment, one or more of the management module 335, control proxy 330, data proxy 340 and storage encryption processor 345 can include logic executed by a central processing unit. Alternatively, one or more of the management module 335, control proxy 330, data proxy 340 and storage encryption processor 345 can be implemented as a series of state machines (e.g., an internal logic that knows how to perform a sequence of operations), logic circuits (e.g., a logic that goes through a sequence of events in time, or a logic whose output changes immediately upon a changed input [i.e., sequential logic or combinational logic]), or a combination of a state machines and logic circuits.

Figure 4:
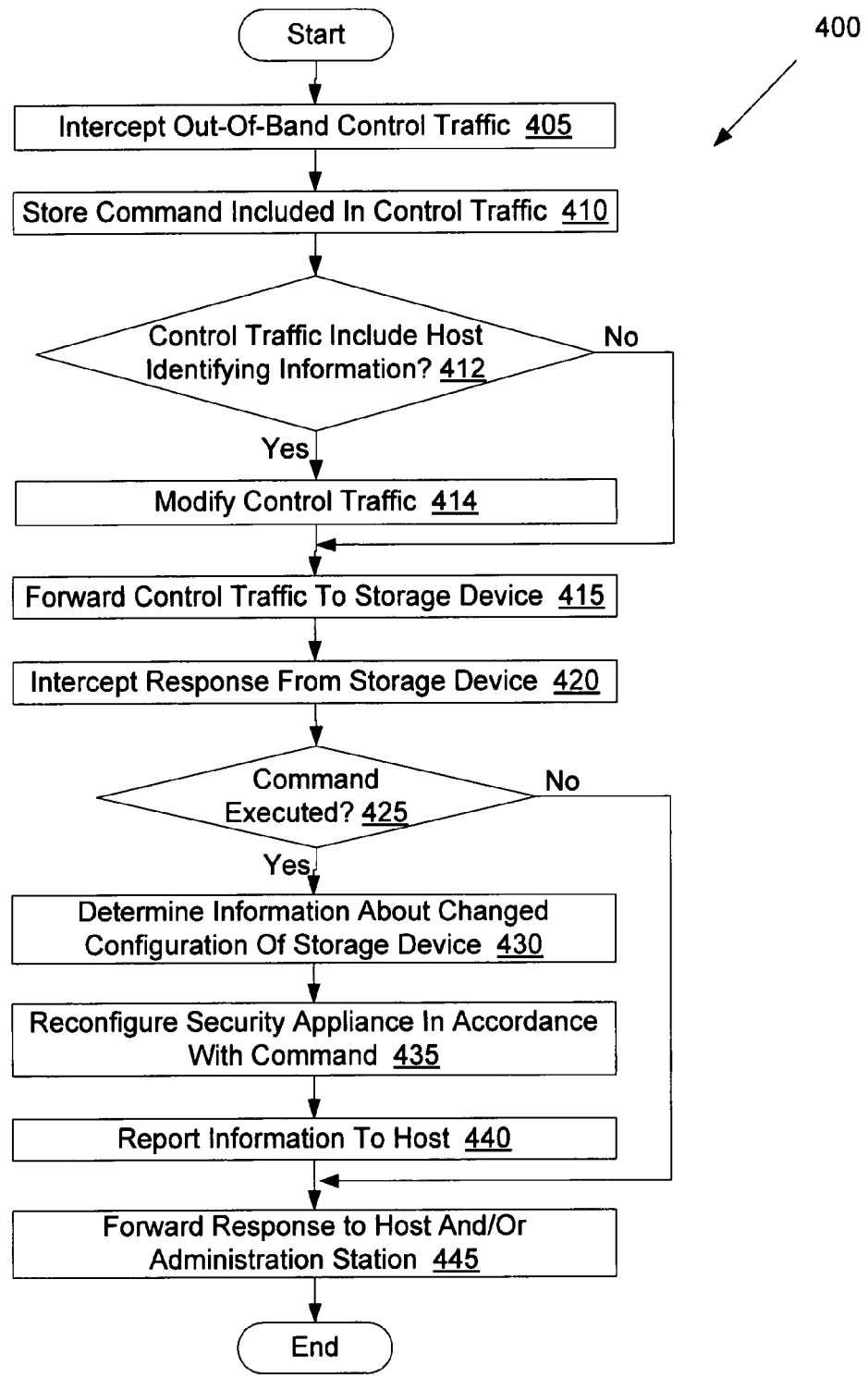
FIG. 4 is a flow diagram illustrating one embodiment of a method for updating a security appliance.

FIG. 4 is a flow diagram illustrating one embodiment of a method 400 for updating a security appliance using the techniques described above. The method may be performed by processing logic that comprises hardware (e.g., circuitry, dedicated logic, programmable logic, microcode, etc.), software (e.g., instructions run on a processing device to perform hardware simulation), or a combination thereof. In one embodiment, method 400 is performed by security appliance 300 of FIG. 3.

Referring to FIG. 4, method 400 includes processing logic intercepting out-of-band control traffic that originates at a host or administration station (block 405). In one embodiment, the out of band control traffic is intercepted by first port 330 and forwarded to control proxy 330 of FIG. 3. The out-of-band control traffic may be formatted according to CIFS, HTTP, SNA, or other network protocols. The out-of-band control traffic includes one or more commands, such as commands to generate a new lun, to modify an existing drive, to resize a partition, and so on. The commands that can be included in the control traffic may depend on a protocol being used and/or on a processing system or file system of a storage device to which the control traffic is directed.

At block 410, a command included in the control traffic is stored. The command may be stored, for example, by control proxy 330 or management module 335 of FIG. 3. The command may be stored in a persistent state (e.g., in nonvolatile memory) or in a non-persistent state (e.g., in volatile memory).

At block 412, processing logic determines whether the control traffic includes host identifying information. Examples of host identifying information include an IP address and a fiber channel WWN of the host. If the control traffic includes host identifying information, the method continues to block 414. If the control traffic does not include host identifying information, the method proceeds to block 415.

At block 414, the control traffic is modified. In one embodiment, the control traffic is modified by control proxy 330 of FIG. 3. In another embodiment, the control traffic is modified by management module 335 of FIG. 3. In one embodiment, modifying the control traffic includes replacing host identifying information with security appliance identifying information. For example, a host IP address can be replaced with an IP address of the security appliance.

At block 415, the control traffic is forwarded to a storage device. The control traffic may be forwarded to a storage device to which it was originally directed, or to a different storage device. At block 420, a response from the storage device is intercepted. In one embodiment, the response is intercepted by first port 315 and forwarded to control proxy 330 of FIG. 3. The response is additional control traffic that originates at the storage device to which the original control traffic was forwarded. The response may indicate whether a command included in the original control traffic was successfully completed. The response may also include additional information, such as an identification of a new lun or drive.

At block 425, processing logic determines whether the command that was included in the original control traffic was successfully executed. In one embodiment, this determination is made by control proxy 330 of FIG. 3. In another embodiment, this determination is made by management module 335 of FIG. 3. If the command was not successfully executed, the method continues to block 445. If the command was successfully executed, the method proceeds to block 430.

At block 430, information about the changed configuration of the storage device is determined. In one embodiment, this determination is made by control proxy 330 of FIG. 3. In another embodiment, this determination is made by management module 335 of FIG. 3. Examples of determined information include drive names, statuses, sizes, etc. of new or existing drives. In one embodiment, information about the changed configuration may be included in the response. Alternatively, information about the changed configuration is obtained by sending inquiries and/or commands to the storage device. Methods available to obtain information about a changed configuration of the storage device may be dependent upon a protocol used and/or on an operating system or file system of the storage device.

At block 435, a security appliance is reconfigured in accordance with the command that was included in the original control traffic. The reconfiguration may be performed, for example, by one or more of the control proxy 330, management module 335, and data proxy 340 of FIG. 3. The reconfiguration allows the security appliance to properly secure and communicate with the storage device subsequent to a new configuration of the storage device. In one embodiment, reconfiguring the security appliance includes updating existing entries and/or adding new entries to a data structure. Such entries may include, for example, an address of a drive or lun, identification of an encryption key associated with a drive or lun, a name of a drive or lun, and so on. If a new drive is added, for example, reconfiguring the security appliance may include creating a database entry to represent the new drive, linking the new database entry with one or more existing entries for a drive array, generating an encryption key to use for the new drive, and granting one or more hosts access to the new drive. In another example, if a backup of an existing drive is mounted, reconfiguring the security appliance may include creating a database entry to represent the mounted backup, linking the database entry with one or more existing entries for a drive array, determining an encryption key to use for the for the mounted backup (e.g., by retrieving metadata stored in the backup to determine an appropriate encryption key to use), and granting one or more hosts access to the mounted backup.

At block 440, the determined information is reported to the host. At block 445, the response is forwarded to the host and/or administration station that sent the initial request. The response may include an indication that the request was or was not successfully completed. The method then ends.

Figure 5:
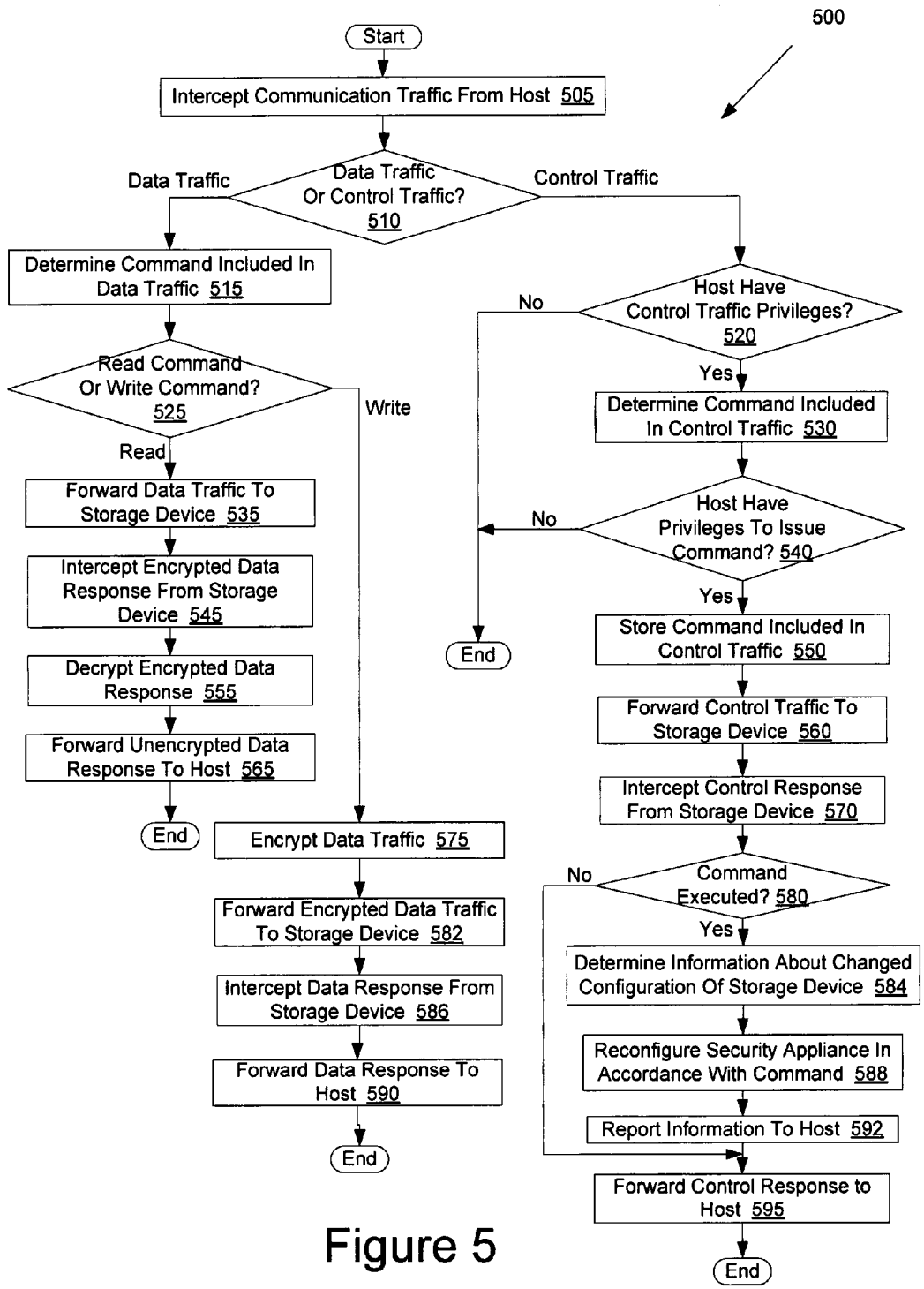
FIG. 5 is a flow diagram illustrating an embodiment of a method for encrypting data.

FIG. 5 is a flow diagram illustrating an embodiment of a method 500 for encrypting data. The method may be performed by processing logic that comprises hardware (e.g., circuitry, dedicated logic, programmable logic, microcode, etc.), software (e.g., instructions run on a processing device to perform hardware simulation), or a combination thereof. In one embodiment, the method 500 is performed by a security appliance such as security appliance 300 of FIG. 3.

Referring to FIG. 5, method 500 begins with intercepting communication traffic from a host (block 505). Such communication traffic may include both data traffic and control traffic. In one embodiment, data traffic and control traffic are intercepted at different ports (e.g., first port 315, second port 320, and third port 325 of FIG. 3). Alternatively, the data traffic and control traffic may be intercepted at the same port or ports.

At block 510, processing logic determines whether intercepted communication traffic is data traffic or control traffic. In one embodiment, data traffic is intercepted by second port 320 and third port 325, and control traffic is intercepted by first port 315 of FIG. 3. If the intercepted communication traffic is control traffic, the method proceeds to block 520. If the intercepted communication traffic is data traffic, the method proceeds to block 515.

At block 515, a command included in the data traffic is determined. In one embodiment, the command is determined by data proxy 340 of FIG. 3. The command may be a read command, a write command, a delete command, or other data related command. At block 525, processing logic determines how to process the command. If the command is a read command, the method proceeds to block 535. If the command is a write command, the method proceeds to block 575. If the command is other than a read or write command (e.g., a delete command), additional actions may be taken. Such additional actions are dependent on the command. For example, if a command is a delete command, data may be deleted. However, for the sake of simplicity, method 500 illustrates only those steps to take when a read or write command (the most common commands) are determined.

At block 535, the intercepted data traffic is forwarded to a storage device. The storage device can then execute the command to access and return the data requested in the read command. Data stored on the storage device may be stored in an encrypted state. Therefore, data included in the response may be in an encrypted state. Processing logic intercepts the encrypted data response from the storage device at block 545.

At block 555, the encrypted data response is decrypted. In one embodiment, storage encryption processor 345 of FIG. 3 performs the decryption. The unencrypted data response is then forwarded to the host.

At block 575 (which is initiated if a write command is received), the data traffic is encrypted. In one embodiment, storage encryption processor 345 of FIG. 3 performs the encryption. In one embodiment, a data portion of the data traffic is encrypted, while a command portion (e.g., the command instructing the data portion to be written) is not encrypted. At block 582, the encrypted data traffic is forwarded to the storage device.

At block 568, a data response is intercepted from the storage device. The data response may include information that the data was successfully stored, a storage location (e.g., address) of the storage, and/or other information concerning data storage. At block 590, the data response is forwarded to the host.

At block 520 (which is initiated if control traffic is intercepted), processing logic determines whether the host has control traffic privileges (e.g., privileges to send control traffic). If the host does not have control traffic privileges, the method ends. If the host does have control traffic privileges, the method proceeds to block 530.

At block 530, a command included in the control traffic is determined. The command may be, for example, a command to provision a new drive, mount an old drive, modify a drive, rename a drive, etc. At block 540, processing logic determines whether the host has privileges to issue the command included in the control traffic. If the host does not have sufficient privileges, the method ends. If the host does have sufficient privileges, the method proceeds to block 550.

At block 550, the command included in the control traffic is stored. The command may be stored in a persistent or non-persistent manner. At block 560, the control traffic is forwarded to the storage device. In one embodiment, blocks 520, 530 and 550 are performed by control proxy 330 of FIG. 3. In other embodiments, one or more of blocks 520, 530 and 550 may be performed by management module 335 of FIG. 3.

At block 570, a response from the storage device is intercepted. The response may include information concerning whether the command was carried out successfully, and additional information relating to a result of the command.

At block 580, processing logic determines whether the command was executed. If the command was not executed, the method proceeds to block 595. If the command was successfully executed, the method proceeds to block 584.

At block 584, processing logic determines information about a changed configuration of the storage device. In one embodiment, such information is included in the control response. Alternatively, such information may be obtained by issuing queries to the storage device. Such queries may be protocol or system dependent. For example, within Linux®, a report lun query may be issued to the storage device. If fiber channel is used, fiber channel zoning may be used to determine a map of drives. Other queries are also possible.

At block 588, processing logic reconfigures a security appliance in accordance with a changed configuration of the storage device. Such a reconfiguration is in response to the command issued to the storage device. The reconfiguration allows the security appliance to properly secure and communicate with the storage device subsequent to a new configuration of the storage device. In one embodiment, reconfiguring the security appliance includes updating existing entries and/or adding new entries to a data structure (e.g., as described with reference to FIG. 3). Such entries may include, for example, an address of a drive or lun, identification of an encryption key associated with a drive or lun, a name of a drive or lun, and so on.

At block 592, information concerning the new configuration of the storage device is reported to the host. Such a report may identify a name, location, size, etc. of new or modified drives or luns on the storage device. At block 595, the control response is forwarded to the host. In one embodiment, blocks 592 and 595 are executed simultaneously if the command was successfully executed. The method then ends.

Figure 6:
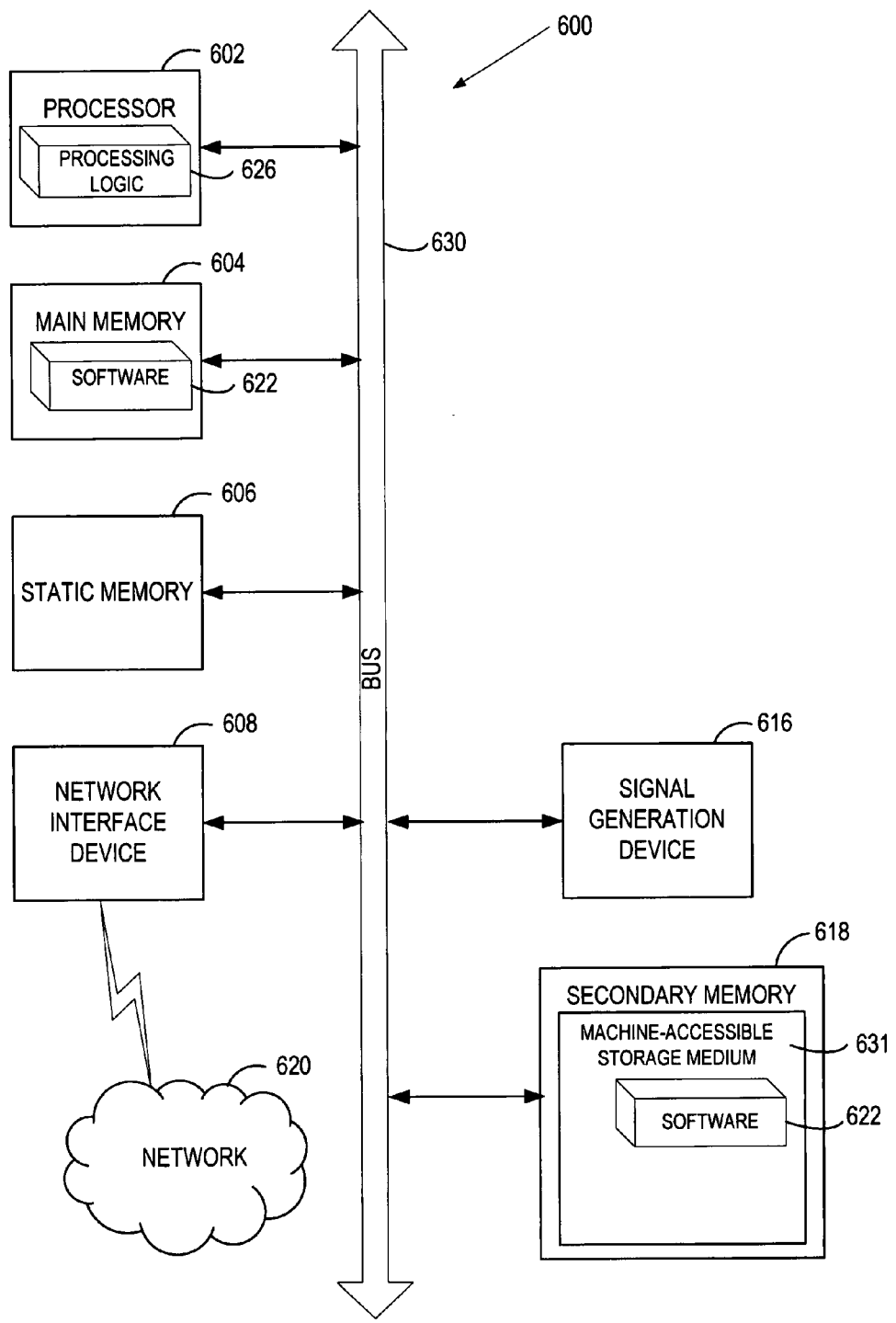
FIG. 6 illustrates a diagrammatic representation of a machine in the exemplary form of a computer system, in accordance with one embodiment of the present invention.

FIG. 6 illustrates a diagrammatic representation of a machine in the exemplary form of a computer system 600 within which a set of instructions, for causing the machine to perform any one or more of the methodologies discussed herein, may be executed. The machine may be connected (e.g., networked) to other machines in a LAN, an intranet, an extranet, or the Internet. The machine may operate in a client-server network environment, or as a peer machine in a peer-to-peer (or distributed) network environment. While only a single machine is illustrated, the term "machine" shall also be taken to include any collection of machines that individually or jointly execute a set (or multiple sets) of instructions to perform any one or more of the methodologies discussed herein. The machine may be a server, a personal computer, a mobile device, or any other device and may represent, for example, a front end server 115, a back end server 125, a client 105, a network appliance 110, or any other computing device. Computer system 600 may be configured to perform the functions, for example, of host 205, security appliance 215, or storage device 210 of FIG. 2A.

The exemplary computer system 600 includes a processing device (processor) 602, a main memory 604 (e.g., read-only memory (ROM), flash memory, dynamic random access memory (DRAM) such as synchronous DRAM (SDRAM) or Rambus DRAM (RDRAM), etc.), and a static memory 606 (e.g., flash memory, static random access memory (SRAM), etc.), which may communicate with each other via a bus 630. Alternatively, the processing device 602 may be connected to memory 604 and/or 606 directly or via some other connectivity means.

Processing device 602 represents one or more general-purpose processing devices such as a microprocessor, central processing unit, or the like. More particularly, the processing device 602 may be complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 602 is configured to execute processing logic 626 for performing the operations and steps discussed herein.

The computer system 600 may further include a network interface device 608 and/or a signal generation device 616. It also may or may not include a video display unit (e.g., a liquid crystal display (LCD) or a cathode ray tube (CRT)), an alphanumeric input device (e.g., a keyboard), and/or a cursor control device (e.g., a mouse).

The computer system 600 may or may not include a secondary memory 618 (e.g., a data storage device) having a machine-accessible storage medium 631 on which is stored one or more sets of instructions (e.g., software 622) embodying any one or more of the methodologies or functions described herein. The software 622 may also reside, completely or at least partially, within the main memory 604 and/or within the processing device 602 during execution thereof by the computer system 600, the main memory 604 and the processing device 602 also constituting machine-accessible storage media. The software 622 may further be transmitted or received over a network 620 via the network interface device 608.

While the machine-accessible storage medium 631 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   intercepting, at a data security appliance, out-of-band control traffic from a computing device directed to a data storage device, wherein the out-of-band control traffic includes a command to change a configuration of the data storage device;
   forwarding the out-of-band control traffic from the data security appliance to the data storage device;
   intercepting, at the data security appliance, a response from the data storage device that indicates the command was successfully executed; and
   reconfiguring automatically and without user interaction, by the data security appliance, a parameter of the data security appliance associated with communication with the data storage device in accordance with the command in order to conform with a new configuration of the data storage device, wherein the reconfiguring is performed as a result of intercepting the response from the data storage device.

2. The method of claim 1, further comprising:
   temporarily storing the command in the data security appliance until the response is intercepted.

3. The method of claim 1, further comprising:
   forwarding the response from the data security appliance to the computing device, wherein the computing device is at least one of a host that sent the out-of-band control traffic or an administration station that sent the out-of-band control traffic.

4. The method of claim 1, further comprising:
   determining information about the changed configuration of the data storage device; and
   reporting the determined information to a host.

5. The method of claim 1, further comprising:
   determining whether the computing device from which the out-of-band control traffic was intercepted has at least one of a first privilege to send the out-of-band control traffic or a second privilege to issue the command; and
   forwarding the out-of-band control traffic to the data storage device if the computing device has at least one of the first privilege or the second privilege.

6. The method of claim 1, wherein the out-of-band control traffic is formatted according to a first communication protocol, the method further comprising:
   intercepting data traffic directed from a host to the data storage device, wherein the data traffic is formatted according to a second communication protocol;
   encrypting the data traffic; and
   forwarding the encrypted data traffic to the data storage device.

7. The method of claim 6, wherein reconfiguring the data security appliance includes updating one or more data structures managed by the data security appliance by performing at least one of adding entries to the one or more data structures or modifying existing entries in the one or more data structures.

8. A non-transitory machine readable medium including instructions that, when executed by a machine, cause the machine to perform a method comprising:
   intercepting, at a data security appliance, communication traffic from a computing device directed to a data storage device;
   forwarding the communication traffic from the data security appliance to the data storage device;
   intercepting, at the data security appliance, a response from the data storage device that indicates a command was successfully executed; and
   if the communication traffic includes out-of-band control traffic having a command to change a configuration of the data storage device, reconfiguring automatically and without user interaction, a parameter of the data security appliance associated with communication with the data storage device in accordance with the command, wherein the reconfiguring is performed as a result of intercepting the response from the data storage device.

9. The non-transitory machine readable medium of claim 8, wherein the data security appliance is reconfigured in order to conform with a changed configuration of the data storage device.

10. The non-transitory machine readable medium of claim 8, the method further comprising:
    forwarding the out-of-band control traffic from the data security appliance to the data storage device; and
    temporarily storing the command in the data security appliance until the response is intercepted by the data security appliance from the data storage device, indicating whether the command was successfully executed.

11. The non-transitory machine readable medium of claim 8, the method further comprising:
    forwarding the response from the data security appliance to the computing device, wherein the computing device is at least one of a host that sent the out-of-band control traffic or an administration station that sent the out-of-band control traffic.

12. The non-transitory machine readable medium of claim 8, the method further comprising:
    determining information about the changed configuration of the data storage device; and
    reporting the determined information to a host.

13. The non-transitory machine readable medium of claim 8, wherein the communication traffic includes the out-of-band control traffic that is formatted according to a first communication protocol and data traffic that is formatted according to a second communication protocol.

14. The non-transitory machine readable medium of claim 8, the method further comprising:
- intercepting traffic directed from a host to the data storage device;
- encrypting the data traffic; and
- forwarding the encrypted data traffic to the data storage device.

15. A security apparatus comprising:
- a control proxy to intercept out-of-band control traffic transmitted between a storage device and a computing device, the computing device being at least one of a host or an administration station, wherein the control proxy is configured to forward the out-of-band control traffic from the security apparatus to the storage device;
- the control proxy to intercept a response from the storage device, the response indicating whether the configuration of the storage device has changed, and to forward the response to at least one of the host or the administration station; and
- a management module, connected with the control proxy, to examine control traffic from the storage device to determine whether a configuration of the storage device has changed, and to reconfigure automatically and without user interaction, a parameter of the security apparatus associated with communication with the storage device if the configuration of the storage device has changed.

16. The security apparatus of claim 15, wherein the out-of-band control traffic is formatted according to a first communication protocol, further comprising:
- a data proxy, connected with the management module, to intercept data traffic directed from the computing device to the storage device, to encrypt the data traffic, and to forward the encrypted data traffic to the storage device, wherein the data traffic is formatted according to a second communication protocol.

17. The security apparatus of claim 15, further comprising:
- a storage module, connected with the control proxy, to temporarily store the out-of-band control traffic until it is determined whether the configuration of the storage device has changed.

18. The security apparatus of claim 15, wherein the management module is configured to query the storage device to determine information about the changed configuration of the storage device.

19. The security apparatus of claim 15, wherein the management module is configured to determine whether the host has at least one of a first privilege to send the out-of-band control traffic or a second privilege to issue a command included in the out-of-band control traffic.

20. A method comprising:
- intercepting, at a security appliance, data traffic and out-of-band control traffic transmitted from a host to a storage device, the out-of-band control traffic being formatted according to a first protocol and including a command to change a configuration of the storage device, and the data traffic being formatted according to a second protocol and including at least one of a read command or a write command, the host being a computing device;
- forwarding the out-of-band control traffic from the security appliance to the storage device;
- intercepting, at the security appliance, a response from the storage device that indicates the command was successfully executed; and
- reconfiguring automatically and without user interaction, by the security appliance, a parameter of the security appliance associated with communication with the storage device in accordance with the command in order to conform with a changed Configuration of the storage device, wherein the reconfiguring is performed upon intercepting the response from the data storage device.

21. A security apparatus comprising:
- a first port to send unencrypted data traffic to, and receive unencrypted data traffic from, a host;
- a second port to send encrypted data traffic to, and to receive encrypted data traffic from, a storage device;
- a data proxy connected with the first port and the second port, the data proxy to manage encryption, decryption and transmission of data traffic;
- a third port to send out-of-band control traffic to, and to receive out-of-band control traffic from, one or more of a host, an administration station, and a storage device;
- a control proxy connected with the first port to receive the out-of-band control traffic, to modify the out-of-band control traffic to remove identifying information of at least one of the host, the administration station, or the storage device, and to examine control traffic from the storage device to determine whether a configuration of the storage device has changed; and
- a management module connected with the control proxy and with the data proxy, the management module to automatically and without user interaction, direct a reconfiguration parameter of the data proxy associated with communication with the storage device if the configuration of the storage device has changed.

* * * * *